(12) United States Patent
Liu et al.

(10) Patent No.: US 12,139,185 B2
(45) Date of Patent: Nov. 12, 2024

(54) FULL-DAY TRAIN OPERATION DIAGRAM GENERATION METHOD BASED ON TIME DIVISION SCHEME AND ACTIVITY-EVENT RELATIONSHIP

(71) Applicant: CASCO SIGNAL LTD., Shanghai (CN)

(72) Inventors: Fengbo Liu, Shanghai (CN); Jiang Qian, Shanghai (CN); Honghui Yan, Shanghai (CN); Jing Xu, Shanghai (CN); Tingliang Zhou, Shanghai (CN); Lanxiang Wang, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 312 days.

(21) Appl. No.: 17/596,088

(22) PCT Filed: Oct. 19, 2020

(86) PCT No.: PCT/CN2020/121771
§ 371 (c)(1),
(2) Date: Dec. 2, 2021

(87) PCT Pub. No.: WO2021/196566
PCT Pub. Date: Oct. 7, 2021

(65) Prior Publication Data
US 2022/0242468 A1   Aug. 4, 2022

(30) Foreign Application Priority Data

Mar. 30, 2020 (CN) .......................... 202010233719.5

(51) Int. Cl.
*B61L 27/12* (2022.01)
*B61L 27/20* (2022.01)
*G06Q 10/047* (2023.01)

(52) U.S. Cl.
CPC ............... *B61L 27/12* (2022.01); *B61L 27/20* (2022.01); *G06Q 10/047* (2013.01)

(58) Field of Classification Search
CPC .......... B61L 27/20; B61L 27/00; B61L 27/12; G06Q 10/06313
See application file for complete search history.

(56) References Cited

FOREIGN PATENT DOCUMENTS

| CN | 105523062 A | 4/2016 |
|---|---|---|
| CN | 110406567 A | 11/2019 |

(Continued)

OTHER PUBLICATIONS

Jiang et al., "Urban rail transit networkthe train operation organization and management", Aug. 31, 2018, p. 117 with translation, cited in ISR.

(Continued)

*Primary Examiner* — Yuri Kan
(74) *Attorney, Agent, or Firm* — HSML P. C.

(57) ABSTRACT

The present invention relates to a full-day in each train operation diagram generation method based on a time division scheme and an activity-event relationship, the method including: S1: configuring operation scheme basic parameters; S2: constructing a quantitative relationship between a travel time and a driving interval for different routing ratios and calculating, within a given turn-back time range, an actual turn-back time of each turn-back station that can achieve a routing ratio requirement; S3: generating an arrival event time and a departure event time of a train in each time period at a station platform in accordance with routing division, direction division, and proportion division, correcting a start time and a stop time of each routing in accordance with time period division, and performing transition between the time periods; and S4: connecting a train section operation activity and a stop activity according to the full-time train arrival and departure event times obtained by executing step S3 for a plurality of times, matching an underbody turn-back activity with ex-warehousing and warehousing activities, and correcting arrival and departure times related to a track occupation conflict, thus obtaining a full-day train operation diagram. Compared with the prior art, the present invention has the advantages of a standardized routing ratio, automatic high-low peak connection transition, and the like.

9 Claims, 4 Drawing Sheets

(56) References Cited

FOREIGN PATENT DOCUMENTS

| | | | | | |
|---|---|---|---|---|---|
| CN | 111391896 A | | 7/2020 | | |
| CN | 113935581 A | * | 1/2022 | ....... | G06Q 10/06313 |
| JP | 2015123778 A | * | 7/2015 | .............. | B61L 27/00 |

OTHER PUBLICATIONS

Xu et al., "Key Problems in Computer Compilation of Train Diagram in UMT", Urban Mass Transit), No. 5, Dec. 31, 2005, with English translation, Cited in ISR.
International Search Report (with English translation) and Written Opinion issued in PCT/CN2020/121771, dated Jan. 21, 2021.
Xu et al., "Key Problems in Computer Compilation of Train Diagram in UMT", Urban Mass Transit), No. 5, Dec. 31, 2005, with English Abstract.

* cited by examiner

FULL-DAY TRAIN OPERATION DIAGRAM GENERATION METHOD BASED ON TIME DIVISION SCHEME AND ACTIVITY-EVENT RELATIONSHIP

FIELD OF TECHNOLOGY

The present invention relates to a rail transit driving plan automatic generation technology, and in particular, to a full-day train operation diagram generation method based on a time division scheme and an activity-event relationship.

BACKGROUND

Urban rail transit mainly serves the daily commuter passenger flow, but the passenger flow in different time periods and different sections is often unbalanced. Therefore, the operation enterprise needs to formulate corresponding multi-time period operation scheme and multi-routing operation mode for relevant lines, and all these plan requirements are implemented through a full-day train operation diagram. Although current computer compilation tools can help cartographers to complete the compilation of a basic train operation diagram quickly, each line usually requires different versions of train operation diagrams on different working days, different holidays and large-scale activity days. For a network with a plurality of lines, and considering a service demand of updating the train operation diagram irregularly according to changes of passenger flow characteristics, the cartographers are faced with the pressure of heavy workload, diverse requirements and sometimes urgency. Through summarization of the characteristics of the operation scheme and work difficulties of the cartographers, it is found that the computer compilation of the train operation diagram of an urban rail transit line faces the following key problems:

(1) Multiple routing ratio problem: there are a single routing, large and small routings, a Y-shaped routing, connected routings, and combined complex routings, there are three or more routing combinations, and the routing configurations in different time periods and a proportional relationship between a quantity of trains driving on each routing may be different.

(2) Connection and transition problem of a multi-time period scheme: the main difference of the multi-time period scheme is that driving intervals of the time periods are different, so that a quantity of used underbodies is different, reasonable driving intervals, conflict-free underbody turn-back, and underbody ex-warehousing and warehousing need to be arranged for the connection transition between a high peak and a low peak.

(3) Turn-back cross interference and ex-warehousing and warehousing distribution problem: judgment of the turn-back underbody and ex-warehousing and warehousing underbody, conflict relief when different turn-back modes and different turn-back tracks are used in a mixed mode before and after a station, and automatic paving and drawing of an ex-warehousing and warehousing operation line.

After retrieval, in the invention patent of Chinese patent publication No. CN107284480B, entitled "AUTOMATIC COMPILATION METHOD OF TRAIN OPERATION DIAGRAM BASED ON UNDERBODY DUPLEXING", an optimization model of the train operation diagram is solved according to a compilation basic parameter and an operation scheme and by using a mixed integer linear plan algorithm, and a train operation diagram is obtained based on a quantity of underbodies that are put into operation. The patent aims at a case in which a quantity of underbodies that has been put into operation has been determined, and is based on and limited by the supply of transport capacity resources. However, for a new line, before the new line is opened, an operation diagram is often compiled according to an operation scheme taking a driving interval as a main parameter, and a quantity of underbodies that need to be put into operation is determined. In addition, for a line that has been put into operation, the operation enterprises mainly pay attention to a meeting condition of a passenger transport demand, and when a transport capacity is adjusted or improved, transport capacity resources such as the quantity of underbodies that are put into operation are adjusted according to a change of the driving interval. Therefore, the patent has a particular limitation.

Jiang zhibing, Xurui, and the like published an article of urban rail transit train operation diagram computer compilation problem, problems of a common line routing train operation diagram base map structural design, an underbody running and non-running application manner, and reasonable matching of a train operation interval are researched in an article of a computer compilation urban rail transit common line routing train operation diagram [J]. Journal of Tongji University (Natural Science Edition) (05): 72-76, and an optimization model of a quantity of used underbodies under conditions of independent and running of underbody in common line routing is established and a calculation tool is developed in an article of the application optimization of urban rail transit train operation multi-routing and a common line [J]. Journal of TongJi University (Natural Science Edition), 2013, 42(9): 1333-1339. However, to strictly follow a start time and a stop time of a time period, the results lead out a concept of a second cycle, so that two driving intervals exist in each operation cycle, and a phenomenon of uneven intervals is easy to occur, and the connection and transition of the operation lines between a high peak time period and a low peak time period is not facilitated.

SUMMARY

A purpose of the present invention provides a full-day train operation diagram generation method based on a time division scheme and an activity-event relationship to overcome the defects in the prior art. In the method a routing ratio is standardized, connection and transition is performed on a high peak and a low peak, and underbody turn-back and ex-warehousing and warehousing are matched according to a time period division operation scheme, and automatic generation of a full-day train operation diagram is implemented according to a relationship among arrival and departure events of a train and an operation activity, a stop activity, a turn-back activity as well as ex-warehousing and warehousing activities.

The purpose of the present invention may be achieved through the following technical solutions.

A full-day train operation diagram generation method based on a time division scheme and an activity-event relationship is provided, including the following steps:

S1: configuring operation scheme basic parameters, including a station and a station sequence, operation and stop times, a turn-back time range, an operation duration and time period division, a routing ratio, and a driving interval;

S2: constructing a quantitative relationship between a travel time and the driving interval for different routing ratios according to the operation scheme basic parameters in step S1, and keeping other basic parameters unchanged and calculating, within a given turn-back time range, an actual turn-back time of each turn-back station that can achieve a routing ratio requirement;

S3: generating an arrival event time and a departure event time of a train in each time period at a station platform in accordance with routing division, direction division, and proportion division according to the operation scheme basic parameters in step S1 and the actual turn-back time of each turn-back station calculated in step S2, correcting a start time and a stop time of each routing in accordance with time period division, and performing transition between the time periods; and S4: connecting a train section operation activity and a stop activity according to the full-time train arrival and departure event times obtained by executing step S3 for a plurality of times, matching an underbody turn-back activity with ex-warehousing and warehousing activities, and correcting arrival and departure times related to a track occupation conflict, thus obtaining a full-day train operation diagram.

Preferably, the configuring the routing ratio parameter specifically includes:

defining two routing configurations, which are a routing 1 and a routing 2 respectively, and unifying defining rules of the two routings in a case that a plurality of routings are combined; defining ratio parameters of the two routings, which are R1 and R2 respectively; representing a single routing configuration or a multi-routing configuration by using values of R1 and R2, where a case where one of R1 and R2 is 0 represents the single routing configuration, and a case where none of R1 and R2 is 0 represents the multi-routing configuration; and when three or more routings exist, combining routings with more common line segments, keeping two routings, and adjusting corresponding ratio parameters.

Preferably, the operation and stop times and the driving interval can be set to different values in different time periods, and when a plurality of routings exist, the driving interval refers to a driving interval of a common line segment.

Preferably, the constructing a quantitative relationship between a travel time and the driving interval for different routing ratios specifically includes:

constructing the quantitative relationship among operation cycles of two routings, a travel time difference between non-common line segments, and a driving interval of a common line segment in a case that the routing ratio of the common line segment exists, where for the single routing, only a multiple relationship between the operation cycle of the routing and the driving interval is considered.

Preferably, the generating an arrival event time and a departure event time of a train in each time period at a station platform in accordance with routing division, direction division, and proportion division specifically includes:

firstly generating a reference routing and a reference direction with a train set as a unit when a routing with a common line segment exists, and dividing only the direction when a single routing exists;

directly generating arrival and departure events of an operation line of the reference routing in the reference direction based on the start time and the stop time of the time period and a routing train set interval, and separating arrival and departure events of a non-reference routing and events corresponding to the reference routing by a driving interval of a common line segment at stations at two ends of the common line segment; and in a non-reference direction, backwardly generating a previous part of arrival and departure events of an operation line of each routing based on a departure time and an actual turn-back tome of the operation line in the reference direction, and generating a latter part based on an actual end time of the time period and the routing train set interval, where any one of a routing 1 or a routing 2 can be selected for the reference routing, any one of an uplink direction or a downlink direction can be selected for the reference direction, and when the train set is more than one, a plurality of train numbers on the same routing are abstracted into one train set.

Preferably, the correcting a start time and a stop time of each routing in each time period specifically includes:

(1) leaving a particular duration before a planned end time when a train set is generated in each time period and each direction, where the duration is set as TW and a value of TW is specifically:

TW=the planned end time−the routing train set interval*round ((the planned end time−an actual start time)/ the routing train set interval);

0.5*the routing train set interval<TWreference direction<1*the routing train set interval; and 0.5*the routing train set interval<TWnon-reference direction<1.5*the routing train set interval; and determining an actual end time in each routing and each direction by using the duration as a time window for performing transition with a subsequent time period and with reference to a planned time.

(2) in the reference direction, calculating an actual start time of a non-reference routing based on a position of a first station of the common line segment, an actual start time of a reference routing being consistent with a planned start time; and in the non-reference direction, backwardly calculating an actual start time of two routings by using a turn-back time of a departure event that has been generated in the reference direction, wherein the actual start time is at least one safety interval later than an actual end time of a previous period; and (3) performing comparison to obtain arrival and departure events of the last train set of the common line segment of the reference routing and the non-reference routing in the reference direction, and using the arrival and departure events as a planned start time of a subsequent time period.

Preferably, the connecting a train section operation activity and a stop activity specifically includes:

recognizing continuous arrival and departure events of all the same train numbers, forming the stop activity by using an arrival event and a departure event at the same station, and forming the section operation activity by using an arrival event and a departure event at adjacent stations, thus obtaining a full-time train number operation line.

Preferably, the matching an underbody turn-back activity with entry and out activities specifically includes:

for each terminal station, performing one-to-one matching for a train number connectable through an underbody turn-back connection based on a sequence of train number departure events, an actual turn-back time of each time period, and a scaled turn-back time in a time window, arranging an ex-warehousing activity for a departure event of which a relatively early arrival event is not found, and arranging warehousing activities for first n−1 arrival events inn arrival events corresponding to a departure event and arrival events of which relatively late departure events are not found, where n>1.

The scaled turn-back time in the time window refers to an allowed value of a turn-back time when the time periods are connected, and the value is any value in a range between a minimum turn-back time and a maximum turn-back time.

The arranging the ex-warehousing activity and the warehousing activity specifically includes:

determining different manners of direct (forward direction) connection or connection after turn-back (backward direction) based on a specified depot, and generating an operation line required by ex-warehousing and warehousing between the depot and the terminal station, wherein the operation line comprises arrival and departure events at an intermediate station and a related section operation activity, a stop activity, and a turn-back activity at a required turn-back station.

Preferably, the correcting arrival and departure times related to a track occupation conflict specifically includes:

for each terminal station, increasing rail transferring arrival and departure events and times for turning back after the station in an underbody turn-back manner (after/before station), and performing arrangement according to progressive steps of a fixed turn-back line, vacating the turn-back line as early as possible, turning back alternately, and translating some operation lines, until no conflict exists; and uniformly correcting departure and arrival platform information of turn-back before the station.

Compared with the prior art, the present invention has the following advantages:

1. The routing ratio is standardized, which is applicable to a variety of single routing and complex routing operation modes in the existing urban rail operation practice.

2. Operation line is generated in accordance with time period division, routing division, direction division, and proportion division, and a logical relationship among time period connection, a common line between routings, turn back between directions, and a train set or a train number is considered, so as to ensure the rationality of automatic generation of the operation line.

3. By setting aside a time window before a planned end time of the time period, fine-tuning an actual end time of the time period and synchronizing a start time of a subsequent time period, it not only ensures that a driving interval of the time period is followed before the time window, but also facilitates the connection and transition of adjacent time periods within the time window.

4. Underbody activities are arranged in sequence throughout the time period, which can fully connect all turn-back activities. For ex-warehousing and warehousing activities obtained through screening, ex-warehousing and warehousing modes are determined according to a depot position, and ex-warehousing and warehousing operation lines are automatically generated.

DESCRIPTION OF THE EMBODIMENTS

Clear and complete description will be made to the technical schemes in embodiments of the present invention in conjunction with drawings in the embodiments of the present invention hereafter. Obviously, the described embodiments are merely a part of embodiments of the present invention and not all the embodiments. Based on the embodiments of the present invention, all of other embodiments obtained by a person of ordinary skill in the art without any creative effort shall belong to the protection scope of the present invention.

The present invention provides a full-day train operation diagram generation method based on a time division scheme and an activity-event relationship. According to a commonly used time period division operation scheme, a train arrival and departure event generation method is designed for a standardized routing ratio and high-low peak connection and transition; and then, according to a relationship between train arrival and departure events and an operation activity, a stop activity, a turn-back activity as well as ex-warehousing and warehousing activities, arrival and departure points are connected to form an operation line, the operation line is matched to form underbody turn-back, and an underbody ex-warehousing and warehousing operation line is arranged, thereby implementing the automatic generation of a full-day train operation diagram.

Figure 1:
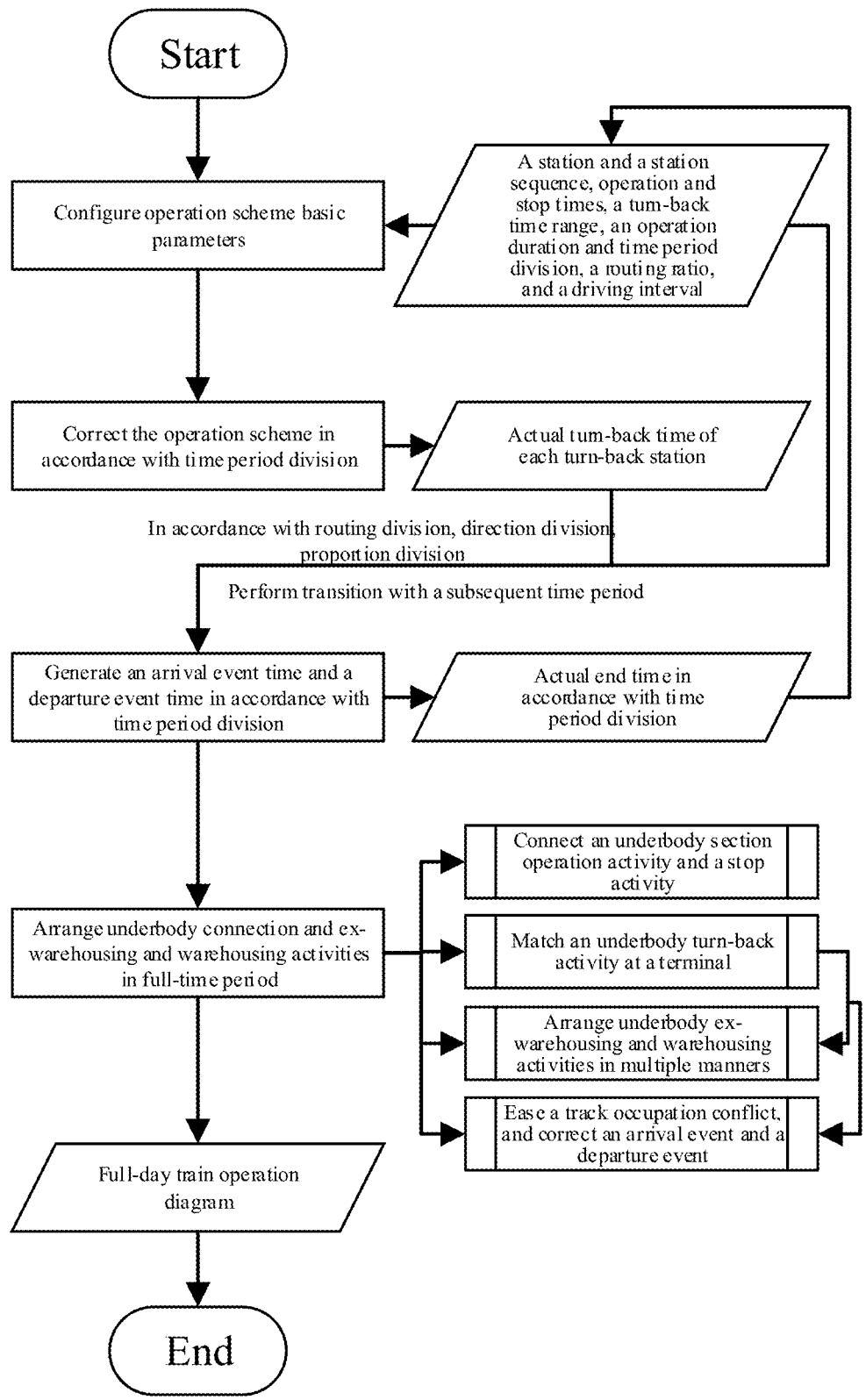
FIG. 1 is a technology roadmap of the present invention.

Referring to FIG. 1, the present invention is further described below, and the method of the present invention includes the following implementation steps:

S1. Configure operation scheme basic parameters, including a station and a station sequence, operation and stop times, a turn-back time range, an operation duration and time period division, a routing ratio, and a driving interval. A routing 1 and a routing 2 are defined, a parameter value of a routing ratio of R1:R2 is controlled, to standardize the routing ratio. Rules are defined uniformly in a case that a plurality of routing combinations are configured, a single routing is processed into that one of R1 and R2 is 0, three or more routings are processed into that routings with more common line segments are combined, and two routings are corrected after an operation line is generated; operation and stop times and the driving interval can be configured to different values; and when a plurality of routings exist, only the driving interval of the common line segment needs to be inputted for the driving interval configuration.

S2. Construct, according to the operation scheme basic parameters in step S1, a quantitative relationship among operation cycles of two routings, a travel time difference between non-common line segments, and a driving interval of a common line segment in a case that the routing ratio of the common line segment exists, where for the single routing, only a multiple relationship between the operation cycle of the routing and the driving interval is considered, and keep other basic parameters unchanged and calculate, within a given turn-back time range, an actual turn-back time of each turn-back station that can achieve a routing ratio requirement.

Figure 2:
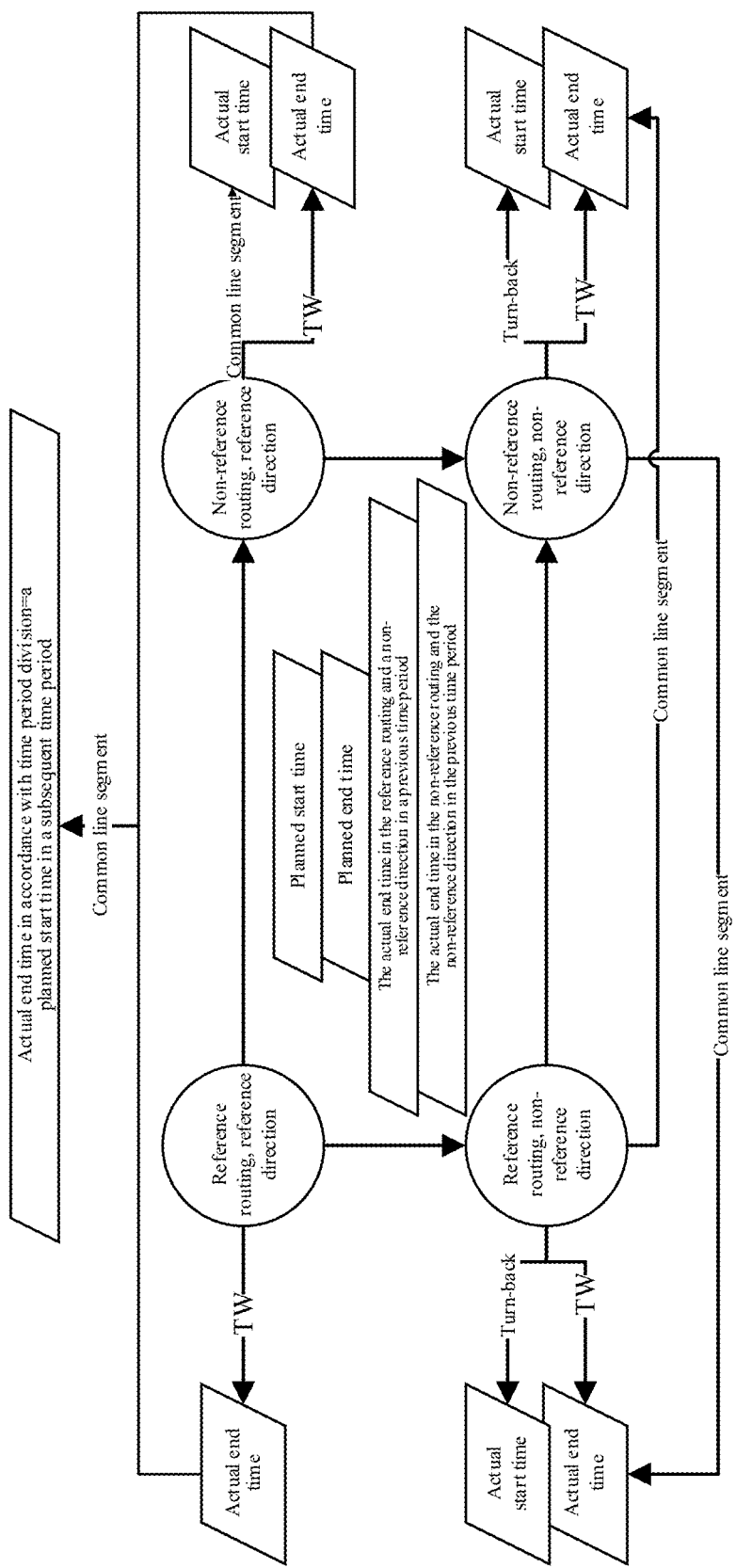
FIG. 2 is a logic diagram of a start and a stop time of corrected time division.

S3. Set a reference direction and a reference routing according to the operation scheme in step S1 and the parameters corrected in accordance with time period division in step S2, and generate an arrival event time and a departure event time of a train in each time period at a station platform in accordance with routing division, direction division, and proportion division by considering that a case where the routing ratio is greater than 1 is a train set and a logical relationship among time period connection, a common line between routings, turn back between directions, and a train set or a train number; and correct a start time and a stop time of each routing in accordance time period division according to a logical flow shown in FIG. 2, by leaving a time widow before a planned end time, complete connection and transition between the time periods, to ensure that a planned driving interval is followed within a main time period outside the time window.

Figure 3:
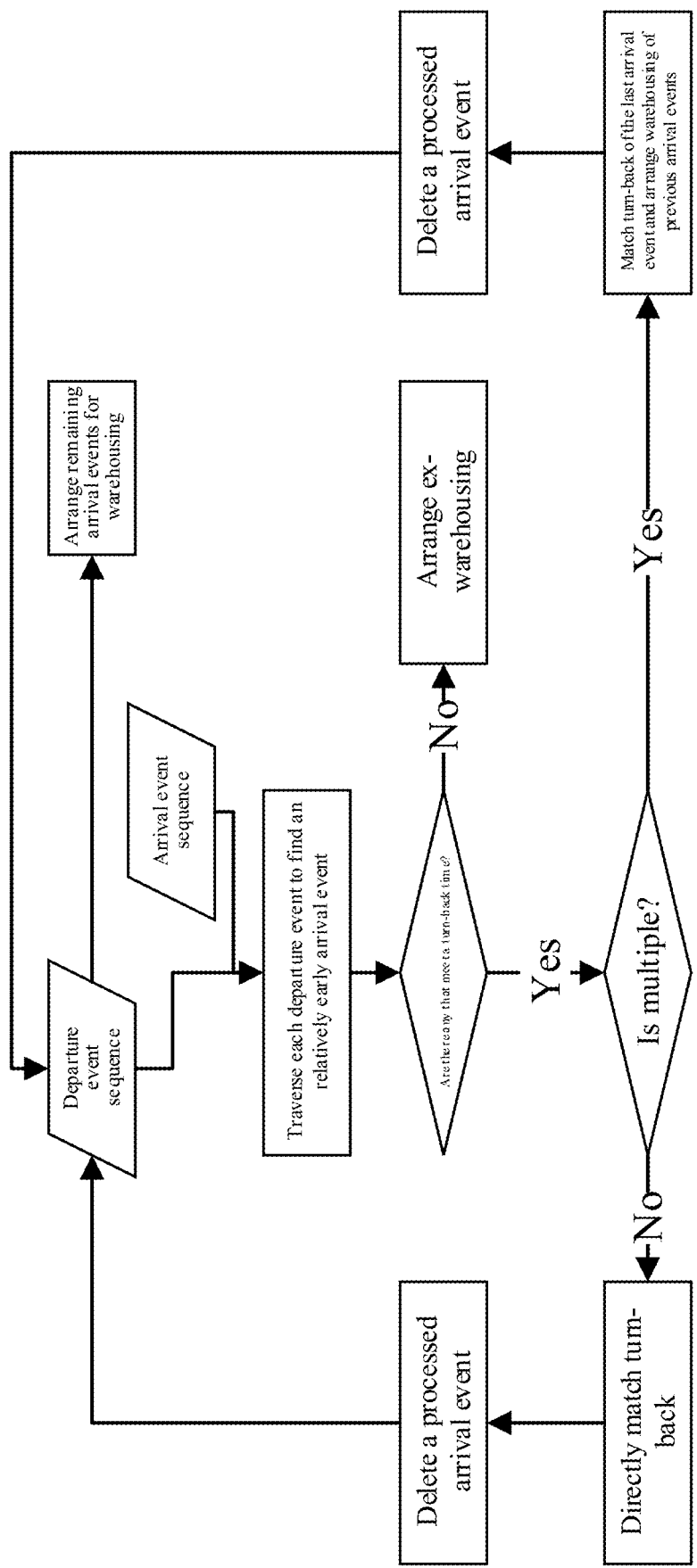
FIG. 3 is a logic diagram of matching between underbody turn-back and ex-warehousing and warehousing.

S4. Connect an arrival event and a departure event at the same station according to the full-time period train arrival and departure event times obtained by executing step S3 for a plurality of times, to obtain a full-time period train number operation line; match an underbody turn-back activity with ex-warehousing and warehousing activities according to a sequence of departure and arrival events of the train set operation line and a logical flow in FIG. 3; determine a forward direction connection or backward direction connection manner based on a specified depot, and generate an operation line required by ex-warehousing and warehousing between the depot and the terminal station; and increase rail transferring arrival and departure events and times for turning back after the station, and correct arrival and departure times related to a track occupation conflict according to progressive steps of a fixed turn-back line—vacation of the turn-back line as early as possible—turning back alternately-translating some operation lines, until no conflict exists; and uniformly correct departure and arrival platform information of turn-back before the station.

Figure 4:
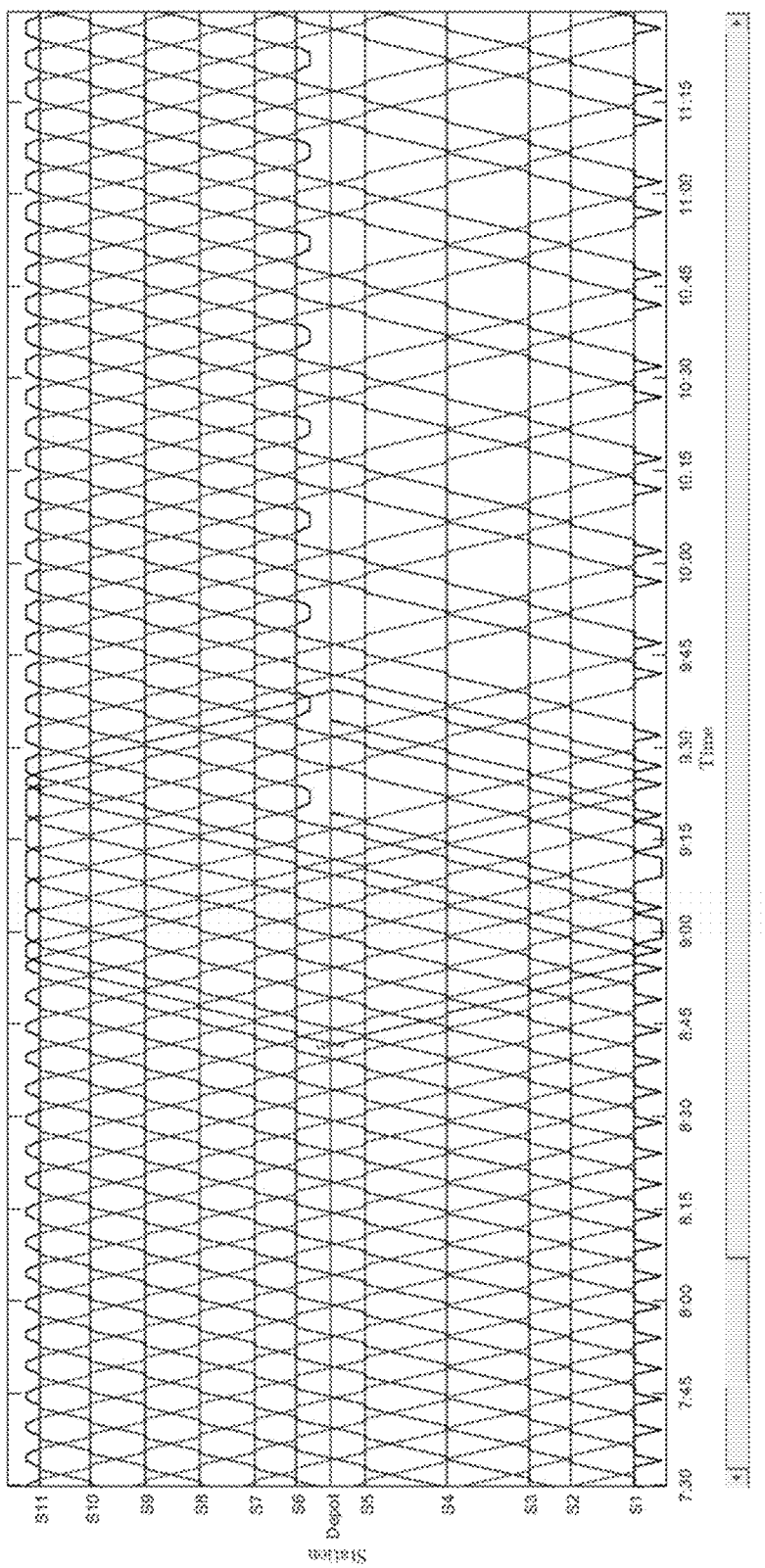
FIG. 4 is an exemplary operation diagram generated by the technical scheme of the present invention.

As shown in FIG. 4, an abstract line with large and small routings is used as an example, the large routing is considered as a routing 1 and is a reference routing, a downlink direction is a reference direction, and a full-day train operation diagram is automatically generated according to the foregoing steps. In order to clearly show an implementation effect of the technical solution of the present invention, FIG. 4 is a partial operation diagram including different routing ratios, high-low peak connection and transition, underbody turn-back and ex-warehousing and warehousing.

The above descriptions are only specific implementations of the present invention. However, the protection scope of the present invention is not limited thereto, any person skilled in the art can easily think of various equivalent modifications or substitutions within the technical scope disclosed by the present invention, and all of these modifications or substitutions shall fall within the protection scope of the present invention. Therefore, the protection scope of the present invention should be determined with reference to the appended claims.

What is claimed is:

1. A full-day train operation diagram generation method based on a time division scheme and an activity-event relationship for a computer compilation tool, comprising the following steps:
    S1: configuring operation scheme basic parameters, comprising a station and a station sequence, operation and stop times, a turn-back time range, an operation duration and time period division, a routing ratio, and a driving interval;
    S2: constructing a quantitative relationship between a travel time and the driving interval for different routing ratios according to the operation scheme basic parameters in step S1, and keeping other basic parameters unchanged and calculating, within a given turn-back time range, an actual turn-back time of each turn-back station that can achieve a routing ratio requirement;
    S3: generating an arrival event time and a departure event time of a train in each time period at a station platform in accordance with routing division, direction division, and proportion division according to the operation scheme basic parameters in step S1 and the actual turn-back time of each turn-back station calculated in step S2, correcting a start time and a stop time of each routing in accordance with time period division, and performing transition between the time periods; and
    S4: connecting a train section operation activity and a stop activity according to the fulltime train arrival and departure event times obtained by executing step S3 for a plurality of times, matching an underbody turn-back activity with ex-warehousing and warehousing activities, and correcting arrival and departure times related to a track occupation conflict, thus obtaining a full-day train operation diagram,
    wherein the generating the arrival event time and the departure event time of the train in each time period at the station platform in accordance with routing division, direction division, and proportion division comprises:
    firstly generating a reference routing and a reference direction with a train set as a unit when a routing with a common line segment exists, and dividing only the direction when a single routing exists;
    directly generating arrival and departure events of an operation line of the reference routing in the reference direction based on the start time and the stop time of the time period and a routing train set interval, and separating arrival and departure events of a non-reference routing and events corresponding to the reference routing by a driving interval of a common line segment at stations at two ends of the common line segment; and
    in a non-reference direction, backwardly generating a previous part of arrival and departure events of an operation line of each routing based on a departure time and an actual turn-back tome of the operation line in the reference direction, and generating a latter part based on an actual end time of the time period and the routing train set interval, wherein
    any one of a routing 1 or a routing 2 is selected for the reference routing, any one of an uplink direction or a downlink direction is selected for the reference direction, and when the train set is more than one, a plurality of train numbers on the same routing are abstracted into one train set,
    the method further comprising operating the train based on the generated full-day train operation diagram.

2. The full-day train operation diagram generation method based on a time division scheme and an activity-event relationship according to claim 1, wherein the configuring the routing ratio parameter specifically comprises:
    defining two routing configurations, which are the routing 1 and the routing 2 respectively, and unifying defining rules of the two routings in a case that a plurality of routings are combined; defining ratio parameters of the two routings, which are R1 and R2 respectively; representing a single routing configuration or a multi-routing configuration by using values of R1 and R2, wherein a case where one of R1 and R2 is 0 represents the single routing configuration, and a case where none of R1 and R2 is 0 represents the multi-routing configuration; and when three or more routings exist, combining routings with more common line segments, keeping two routings, and adjusting corresponding ratio parameters.

3. The full-day train operation diagram generation method based on a time division scheme and an activity-event relationship according to claim 1, wherein the operation and stop times and the driving interval can be set to different values in different time periods, and when a plurality of routings exist, the driving interval refers to a driving interval of a common line segment.

4. The full-day train operation diagram generation method based on a time division scheme and an activity-event relationship according to claim 1, wherein the constructing a quantitative relationship between a travel time and the driving interval for different routing ratios specifically comprises:

constructing the quantitative relationship among operation cycles of two routings, a travel time difference between non-common line segments, and a driving interval of a common line segment in a case that the routing ratio of the common line segment exists, wherein for the single routing, only a multiple relationship between the operation cycle of the routing and the driving interval is considered.

5. The full-day in each train operation diagram generation method based on a time division scheme and an activity-event relationship according to claim 1, wherein the correcting a start time and a stop time of each routing in accordance time period division specifically comprises:

(1) leaving a particular duration before a planned end time when a train set is generated in each time period and each direction, wherein the duration is set as TW and a value of TW is specifically:

TW=the planned end time−the routing train set interval*round ((the planned end time−an actual start time)/the routing train set interval);

0.5*the routing train set interval<TWreference direction<1*the routing train set interval; and 0.5*the routing train set interval<TWnon-reference direction<1.5*the routing train set interval; and determining an actual end time in each routing and each direction by using the duration as a time window for performing transition with a subsequent time period and with reference to a planned time;

(2) in the reference direction, calculating an actual start time of a non-reference routing based on a position of a first station of the common line segment, an actual start time of a reference routing being consistent with a planned start time; and in the non-reference direction, backwardly calculating an actual start time of two routings by using a turn-back time of a departure event that has been generated in the reference direction, wherein the actual start time is at least one safety interval later than an actual end time of a previous period; and (3) performing comparison to obtain arrival and departure events of the last train set of the common line segment of the reference routing and the non-reference routing in the reference direction, and using the arrival and departure events as a planned start time of a subsequent time period.

6. The full-day train operation diagram generation method based on a time division scheme and an activity-event relationship according to claim 1, wherein the connecting a train section operation activity and a stop activity specifically comprises:

recognizing continuous arrival and departure events of all the same train numbers, forming the stop activity by using an arrival event and a departure event at the same station, and forming the section operation activity by using an arrival event and a departure event at adjacent stations, thus obtaining a full-time train number operation line.

7. The full-day train operation diagram generation method based on a time division scheme and an activity-event relationship according to claim 1, wherein the matching an underbody turn-back activity with entry and out activities specifically comprises:

for each terminal station, performing one-to-one matching for a train number connectable through an underbody turn-back connection based on a sequence of train number departure events, an actual turn-back time of each time period, and a scaled turn-back time in a time window, arranging an ex-warehousing activity for a departure event of which a relatively early arrival event is not found, and arranging warehousing activities for first n−1 arrival events in n arrival events corresponding to a departure event and arrival events of which relatively late departure events are not found, wherein n>1.

8. A full-day train operation diagram generation method based on a time division scheme and an activity-event relationship for a computer compilation tool, comprising the following steps:

S1: configuring operation scheme basic parameters, comprising a station and a station sequence, operation and stop times, a turn-back time range, an operation duration and time period division, a routing ratio, and a driving interval;

S2: constructing a quantitative relationship between a travel time and the driving interval for different routing ratios according to the operation scheme basic parameters in step S1, and keeping other basic parameters unchanged and calculating, within a given turn-back time range, an actual turn-back time of each turn-back station that can achieve a routing ratio requirement;

S3: generating an arrival event time and a departure event time of a train in each time period at a station platform in accordance with routing division, direction division, and proportion division according to the operation scheme basic parameters in step S1 and the actual turn-back time of each turn-back station calculated in step S2, correcting a start time and a stop time of each routing in accordance with time period division, and performing transition between the time periods; and S4: connecting a train section operation activity and a stop activity according to the fulltime train arrival and departure event times obtained by executing step S3 for a plurality of times, matching an underbody turn-back activity with ex-warehousing and warehousing activities, and correcting arrival and departure times related to a track occupation conflict, thus obtaining a full-day train operation diagram, wherein the matching an underbody turn-back activity with entry and out activities specifically comprises:

for each terminal station, performing one-to-one matching for a train number connectable through an underbody turn-back connection based on a sequence of train number departure events, an actual turn-back time of each time period, and a scaled turn-back time in a time window, arranging an ex-warehousing activity for a departure event of which a relatively early arrival event is not found, and arranging warehousing activities for first n−1 arrival events in n arrival events corresponding to a departure event and arrival events of which relatively late departure events are not found, wherein n>1, wherein the scaled turn-back time in the time window refers to an allowed value of a turn-back time when the time periods are connected, and the value is any value in a range between a minimum turn-back time and a maximum turn-back time; and the arranging the ex-warehousing activity and the warehousing activity specifically comprises:
determining different manners of direct connection or connection after turn-back based on a specified depot, and generating an operation line required by ex-warehousing and warehousing between the depot and the terminal station, wherein the operation line comprises arrival and departure events at an intermediate station and a related section operation activity, a stop activity, and a turn-back activity at a required turn-back station,
the method further comprising operating the train based on the generated full-day train operation diagram.

9. A full-day train operation diagram generation method based on a time division scheme and an activity-event relationship for a computer compilation tool, comprising the following steps:
S1: configuring operation scheme basic parameters, comprising a station and a station sequence, operation and stop times, a turn-back time range, an operation duration and time period division, a routing ratio, and a driving interval;
S2: constructing a quantitative relationship between a travel time and the driving interval for different routing ratios according to the operation scheme basic parameters in step S1, and keeping other basic parameters unchanged and calculating, within a given turn-back time range, an actual turn-back time of each turn-back station that can achieve a routing ratio requirement;
S3: generating an arrival event time and a departure event time of a train in each time period at a station platform in accordance with routing division, direction division, and proportion division according to the operation scheme basic parameters in step S1 and the actual turn-back time of each turn-back station calculated in step S2, correcting a start time and a stop time of each routing in accordance with time period division, and performing transition between the time periods; and
S4: connecting a train section operation activity and a stop activity according to the fulltime train arrival and departure event times obtained by executing step S3 for a plurality of times, matching an underbody turn-back activity with ex-warehousing and warehousing activities, and correcting arrival and departure times related to a track occupation conflict, thus obtaining a full-day train operation diagram,
wherein the correcting arrival and departure times related to a track occupation conflict specifically comprises:
for each terminal station, increasing rail transferring arrival and departure events and times for turning back after the station in an underbody turn-back manner, and performing arrangement according to progressive steps of a fixed turn-back line, vacating the turn-back line as early as possible, turning back alternately, and translating some operation lines, until no conflict exists; and uniformly correcting departure and arrival platform information of turnback before the station,
the method further comprising operating the train based on the generated full-day train operation diagram.

* * * * *